(12) United States Patent
Humiston et al.

(10) Patent No.: US 11,708,467 B2
(45) Date of Patent: Jul. 25, 2023

(54) SEAM TAPE AND METHODS OF MANUFACTURE AND USE THEREOF

(71) Applicant: Celgard, LLC, Charlotte, NC (US)

(72) Inventors: Karl F. Humiston, New York, NY (US); Kristoffer K. Stokes, Lunenburg, MA (US); Perry K. Hancock, Murfreesboro, TN (US)

(73) Assignee: Celgard, LLC, Charlotte, NC (US)

( * ) Notice: Subject to any disclaimer, the term of this patent is extended or adjusted under 35 U.S.C. 154(b) by 171 days.

(21) Appl. No.: 17/156,792

(22) Filed: Jan. 25, 2021

(65) Prior Publication Data

US 2021/0155767 A1    May 27, 2021

Related U.S. Application Data

(62) Division of application No. 15/724,359, filed on Oct. 4, 2017, now Pat. No. 10,899,898, which is a division of application No. 14/665,296, filed on Mar. 23, 2015, now Pat. No. 9,790,337.

(60) Provisional application No. 61/968,602, filed on Mar. 21, 2014.

(51) Int. Cl.
| | | |
|---|---|---|
| *C08J 5/18* | (2006.01) | |
| *B32B 5/02* | (2006.01) | |
| *B32B 27/12* | (2006.01) | |
| *B32B 7/00* | (2019.01) | |
| *B32B 27/06* | (2006.01) | |
| *B32B 27/08* | (2006.01) | |
| *B32B 27/28* | (2006.01) | |
| *B32B 27/32* | (2006.01) | |
| *B32B 3/00* | (2006.01) | |
| *B32B 3/26* | (2006.01) | |
| *B29K 23/00* | (2006.01) | |

(52) U.S. Cl.
CPC .................. *C08J 5/18* (2013.01); *B32B 3/00* (2013.01); *B32B 3/26* (2013.01); *B32B 5/02* (2013.01); *B32B 5/022* (2013.01); *B32B 5/024* (2013.01); *B32B 5/026* (2013.01); *B32B 7/00* (2013.01); *B32B 27/06* (2013.01); *B32B 27/08* (2013.01); *B32B 27/12* (2013.01); *B32B 27/28* (2013.01); *B32B 27/32* (2013.01); *B29K 2023/06* (2013.01); *B29K 2023/12* (2013.01); *B32B 2305/026* (2013.01); *B32B 2307/514* (2013.01); *B32B 2307/518* (2013.01); *B32B 2307/54* (2013.01); *B32B 2307/558* (2013.01); *B32B 2307/724* (2013.01); *B32B 2307/7242* (2013.01); *B32B 2307/7246* (2013.01); *B32B 2307/7265* (2013.01); *B32B 2405/00* (2013.01); *B32B 2437/00* (2013.01); *C08J 2323/06* (2013.01); *C08J 2323/14* (2013.01); *C08J 2323/16* (2013.01); *C08J 2353/00* (2013.01); *Y10T 428/197* (2015.01); *Y10T 428/249978* (2015.04); *Y10T 442/3707* (2015.04); *Y10T 442/3886* (2015.04); *Y10T 442/40* (2015.04); *Y10T 442/494* (2015.04); *Y10T 442/678* (2015.04)

(58) Field of Classification Search
CPC ...... C08J 5/18; C08J 2323/06; C08J 2323/14; C08J 2323/16; C08J 2353/00; B32B 3/00; B32B 3/26; B32B 5/02; B32B 5/022; B32B 5/024; B32B 5/026; B32B 7/00; B32B 27/06; B32B 27/08; B32B 27/12; B32B 27/28; B32B 27/32; B32B 2305/026; B32B 2307/514; B32B 2307/518; B32B 2307/54; B32B 2307/558; B32B 2307/724; B32B 2307/7242; B32B 2307/7246; B32B 2307/7265; B32B 2405/00; B32B 2437/00; Y10T 428/197; Y10T 428/249978; Y10T 442/678; Y10T 442/3707; Y10T 442/3886; Y10T 442/40; Y10T 442/494; B29K 2023/06; B29K 2023/12
USPC ........................................................... 428/61
See application file for complete search history.

(56) References Cited

U.S. PATENT DOCUMENTS

| | | | |
|---|---|---|---|
| 4,777,073 A | 10/1988 | Sheth | |
| 5,134,174 A | 7/1992 | Xu et al. | |
| 6,602,593 B1 | 8/2003 | Callahan et al. | |
| 2006/0147698 A1* | 7/2006 | Carroll | ............ B32B 5/26 428/317.9 |
| 2007/0196638 A1 | 8/2007 | Wei et al. | |
| 2008/0118827 A1 | 5/2008 | Call et al. | |
| 2009/0258560 A1 | 10/2009 | Kristiansen et al. | |
| 2011/0223486 A1* | 9/2011 | Zhang | ............ B29C 55/16 521/143 |
| 2014/0302374 A1 | 10/2014 | Wei et al. | |

FOREIGN PATENT DOCUMENTS

WO    WO 03/106543    12/2004

* cited by examiner

*Primary Examiner* — Brent T O'Hern

(74) *Attorney, Agent, or Firm* — Hammer & Associates, P.C.

(57) ABSTRACT

Provided herein are seam tapes and related methods. The seam tapes can be compatible with polyolefin-based waterproof/breathable (w/b) membranes, including polypropylene (PP) w/b membranes and/or polyethylene (PE) w/b membranes. Also provided are seams sealed by means of these seam tapes, as well as materials, fabrics, and garments including one or more of these sealed seams.

39 Claims, No Drawings

SEAM TAPE AND METHODS OF MANUFACTURE AND USE THEREOF

CROSS-REFERENCE TO RELATED APPLICATIONS

This application is a divisional application of U.S. application Ser. No. 15/724,359, filed Oct. 4, 2017, which claims the benefit of U.S. patent application Ser. No. 14/665,296 filed Mar. 23, 2015, now U.S. Pat. No. 9,790,337, issued on Oct. 17, 2017, which claims the benefit of U.S. Provisional Application No. 61/968,602 filed Mar. 21, 2014, both of which are hereby incorporated herein by reference in their entirety.

FIELD OF THE APPLICATION

In accordance with at least selected embodiments, this application is directed to new or improved seam tapes, products made with seam tapes, methods of manufacture and/or methods of use of seam tapes. In accordance with at least certain embodiments, exemplary seam tapes may be compatible with polyolefin-based waterproof/breathable membranes, including polypropylene membranes and/or polyethylene membranes, and/or seams sealed by means of these seam tapes, as well as, materials, fabrics, and/or garments including one or more of the sealed seams.

BACKGROUND

At least certain polyolefin (PO) microporous membranes and microporous fibers (or materials made therefrom) are known to be waterproof (or at least water resistant) and air permeable due to their chemical composition and structure. Examples of such polyolefin (PO) microporous membranes and hollow fibers or hollow fiber membranes known to be waterproof (or water resistant) and air permeable are various CELGARD® membranes, by way of example only, CELGARD® Z-series membranes, or CELGARD® hollow fibers or hollow fiber membranes produced by Celgard, LLC of Charlotte, N.C.

When constructing a waterproof and breathable garment (waterproof/breathable or w/b), seams typically are taped to prevent leakage through holes made during stitching. Commercially available seam tapes are generally made from polyurethane (PU), and can be used with waterproof/breathable (w/b) membranes made from PU, polyester (PET) and/or Teflon (ePTFE). However, these existing seam tapes may not be compatible with polyolefin-based w/b membranes, including polypropylene (PP) w/b membranes and/or polyethylene (PE) w/b membranes.

SUMMARY

Provided herein are seam tapes. The seam tapes can be compatible with polyolefin-based w/b membranes, including polypropylene (PP) w/b membranes and/or polyethylene (PE) w/b membranes. The seam tapes can comprise a microporous polyolefin film made by a dry-stretch process and including a plurality of pores. In some cases, the plurality of pores can have a substantially round shape. In some cases, the microporous polyolefin film can exhibit a ratio of machine direction tensile strength to transverse direction tensile strength of from 0.5 to 5.0. In some cases, the microporous polyolefin film has a JIS Gurley of 100 seconds or less (e.g., a JIS Gurley of 80 seconds or less).

The melting temperature of the polyolefin can be selected so as to provide a seam tape that (i) can be applied to w/b membranes without damaging the w/b material, and (ii) does not melt at the temperatures encountered during everyday use. For example, the polyolefin can have a melt temperature of from 80° C. to 175° C. In some embodiments, the polyolefin can have a melt temperature of from 80° C. to 120° C. (e.g., from 90° C. to 110° C., from 95° C. to 105° C., or from 99° C. to 100° C.). In other embodiments, the polyolefin can have a melt temperature of from 155° C. to 175° C. (e.g., from 165° C. to 175° C.).

The microporous polyolefin film can be formed from any suitable polyolefin material. In some embodiments, the polyolefin comprises polypropylene, polyethylene, or a combination thereof (e.g., blends thereof and/or copolymers thereof). In some cases, the polyolefin can comprise impact copolymer polypropylene. In some cases, the polyolefin can comprise a polypropylene polyethylene block copolymer. In some cases, the polyolefin can comprise metallocene polyethylene.

In one example, the polyolefin can comprise a polypropylene polyethylene block copolymer having a melt temperature of from 155° C. to 175° C. (e.g., from 165° C. to 175° C.). In one example, the polyolefin can comprise metallocene polyethylene having a melt temperature of from 80° C. to 120° C. (e.g., from 90° C. to 110° C., from 95° C. to 105° C., or from 99° C. to 100° C.).

In some embodiments, the microporous polyolefin film can be a biaxially oriented microporous polyolefin film. In some embodiments, the microporous polyolefin film can have a thickness of from 8 microns to 80 microns. In some embodiments, the microporous polyolefin film can have a TD tensile strength of at least 175 kg/cm$^2$ (e.g., a TD tensile strength of at least 225 kg/cm$^2$). In some embodiments, the microporous polyolefin film can have a TD shrinkage of less than 6.0% at 90° C. and less than 15.0% at 120° C.

The microporous polyolefin film can have a porosity of from 20% to 90% (e.g., a porosity of from 20% to 80%, a porosity of from 40% to 90%, or a porosity of from 65% to 90%). In some embodiments, the plurality of pores in the microporous polyolefin film can have an average pore size of from 0.03 microns to 0.50 microns and an aspect ratio of from 0.75 to 1.25. In some cases, the microporous polyolefin film can have a mean flow pore diameter of at least 0.04 microns (e.g., a mean flow pore diameter of at least 0.05 microns). In some cases, the microporous polyolefin film can have an Aquapore size of at least 0.06 microns (e.g., at least 0.08 microns).

In some embodiments, the microporous polyolefin film can comprise a multi-ply microporous polyolefin film (e.g., a bi-layer polymer film a tri-layer polymer film, or a polymer film comprising more than three layers). Optionally, in some embodiments, the microporous polyolefin film can further comprise a nonwoven material (e.g., a spunbond and/or meltblown nonwoven material), a woven material, a knit material, or a combination thereof disposed on a side of the microporous polyolefin film. In these embodiments, the microporous polyolefin film and the nonwoven material, woven material, and/or knit material can be combined through any suitable process, such as adhesive or thermal lamination, embossing, calendering, or combinations thereof. In some embodiments, the microporous polyolefin film can further comprise an adhesive disposed on the microporous polyolefin film.

As described above, the seam tapes provided herein can be used to seal the seams of waterproof fabrics, including polyolefin-based waterproof fabrics. Accordingly, also provided are seams sealed by means of the seam tapes described herein. The seams can comprise a first edge of waterproof fabric (e.g., polyolefin-based waterproof fabric, such as a PP w/b membrane and/or PE w/b membrane) sewn together to a second edge of waterproof fabric (e.g., polyolefin-based waterproof fabric, such as a PP w/b membrane and/or PE w/b membrane) along a stitch line; and a seam tape described herein adhered to the first edge of waterproof fabric and the second edge of waterproof fabric and covering the stitch line. In some embodiments, the seam can further comprise an adhesive bonding the seam tape to the first edge of waterproof fabric and the second edge of waterproof fabric. In some embodiments, the seam can be substantially free of adhesives. Also provided are materials, fabrics, and garments comprising one or more of the seams described above, as well as methods of making materials, fabrics, and garments using the seam tapes described herein.

DETAILED DESCRIPTION

Provided herein are seam tapes. The seam tapes can be compatible with polyolefin-based w/b membranes, including polypropylene (PP) w/b membranes and/or polyethylene (PE) w/b membranes. The seam tapes can comprise a microporous polyolefin film made by a dry-stretch process and including a plurality of pores.

Suitable microporous polyolefin film may include polyolefin microporous membranes made by dry-stretch processes, such as those described in U.S. Pat. No. 6,602,593 as well as those described in U.S. Patent Application Publication Nos. 2007/0196638, 2008/0118827, 2011/0223486, and 2014/0302374, all of which are hereby incorporated by reference.

In some cases, the microporous polyolefin film can be a uniaxially-oriented polyolefin Celgard membrane, such as those described in U.S. Pat. No. 6,602,593. In other cases, the microporous polyolefin film can be a biaxially-oriented polyolefin Celgard membrane, such as those disclosed in U.S. Patent Application Publication Nos. 2007/0196638 and 2011/0223486. Such biaxially-oriented membranes may, in some instances, perform better as seam tapes than uniaxially-oriented Celgard membranes. Moreover, biaxially-oriented Celgard membranes made from block copolymers of polyethylene and polypropylene may have an additional advantage of exceptionally pleasant touch or hand. However, uniaxially-oriented microporous membranes can also be used.

In one embodiment, the seam tape can include a microporous polyolefin film made by a dry-stretch process. The microporous polyolefin film can include a plurality of pores. In some instances, the pores can be characterized as substantially round shaped. In some embodiments, the plurality of pores in the microporous polyolefin film can have an average pore size, as measured by scanning electron microscopy (SEM) of from 0.03 microns to 0.50 microns. Further, the pore shape can be characterized by an aspect ratio, the ratio of the length to the width of the pore. In some embodiments, the aspect ratio of the pores, as measured by SEM, can range from 0.75 to 1.25 (e.g., from 0.85 to 1.15).

The melting temperature of the polyolefin can be selected so as to provide a seam tape that (i) can be applied to w/b membranes without damaging the w/b material, and (ii) does not melt at the temperatures encountered during everyday use. For example, in some embodiments, the polyolefin can have a melt temperature of at least 80° C. (e.g., at least 85° C., at least 90° C., at least 95° C., at least 100° C., at least 105° C., at least 110° C., at least 115° C., at least 120° C., at least 125° C., at least 130° C., at least 135° C., at least 140° C., at least 145° C., at least 150° C., at least 155° C., at least 160° C., at least 165° C., or at least 170° C.). In some embodiments, the polyolefin can have a melt temperature of 175° C. or less (e.g., 170° C. or less, 165° C. or less, 160° C. or less, 155° C. or less, 150° C. or less, 145° C. or less, 140° C. or less, 135° C. or less, 130° C. or less, 125° C. or less, 120° C. or less, 115° C. or less, 110° C. or less, 105° C. or less, 100° C. or less, 95° C. or less, 90° C. or less, or 85° C. or less).

The polyolefin can have a melt temperature ranging from any of the minimum values described above to any of the maximum values described above. For example, in some embodiments, the polyolefin can have a melt temperature of from 80° C. to 175° C. (e.g., from 80° C. to 120° C., from 90° C. to 110° C., from 95° C. to 105° C., from 155° C. to 175° C., or from 165° C. to 175° C.). In one embodiment, the polyolefin can have a melt temperature of from 99° C. to 100° C.

The microporous polyolefin film can be formed from any suitable polyolefin material. For example, the microporous polyolefin film can be formed from polypropylene, polyethylene, poly 1-butene, poly(4-methyl-1 pentene), polyhexene, polyoctene, blends thereof, and copolymers thereof. In certain embodiments, the polyolefin can comprise polypropylene, polyethylene, or a combination thereof (e.g., blends thereof and/or copolymers thereof).

In some embodiments, the polyolefin can be selected from the group consisting of polypropylene homopolymers (e.g., atactic polypropylene, isotactic polypropylene, and syndiotactic polypropylene), polypropylene copolymers (e.g., polypropylene random copolymers), polypropylene impact copolymers, polyethylene, polyethylene copolymers, polybutylene, poly(4-methyl-1-pentene), and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount (e.g., an amount of less than 10 wt. %, such as from 1 to 7 wt. %).

In some embodiments, the polyolefin can comprise a polyolefin block copolymer. For example, in some cases, the polyolefin can comprise a polypropylene polyethylene block copolymer. PP/PE block copolymers are available from various resin manufacturers. By using a block copolymer that includes at least a small percentage of PE (preferably less than 5%), the resulting film is less stiff, thus giving a softer drape and quieter movement, and also has a lower coefficient of friction, thus giving a silkier touch. Also, such block copolymer films appear to be suitable for TD stretching and for fabricating 60 inch wide (or wider) films for textile applications. In some embodiments, the polyolefin can comprise a low-melting point olefin block polymer, such as octene-PE block copolymer sold by Dow Chemical under the trade name INFUSE.

In certain embodiments, the polyolefin can comprise an impact copolymer polypropylene. Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %.

In some embodiments, the thermoplastic polymer can be a polyethylene. Suitable polyethylenes include, but are not limited to, low density polyethylene, linear low density polyethylene, medium density polyethylene, high density polyethylene, and combinations thereof. In certain embodiments, the thermoplastic polymer can be selected from the group consisting of medium density polyethylene, high density polyethylene, and mixtures thereof. In certain embodiments, the thermoplastic polymer can be a high density polyethylene.

In some embodiments, the polyolefin can comprise a low-melting point olefin polymer, such as a metallocene-catalyzed polyolefin. Examples of suitable metallocene-catalyzed polyolefins include metallocene polyethylenes and metallocene polyethylene copolymers. A metallocene is a compound typically consisting of two cyclopentadienyl anions (Cp, which is $C_5H_5-$) bound to a metal center (M) in the oxidation state II, with the resulting general formula $(C_5H_5)_2M$. Closely related to the metallocenes are the metallocene derivatives (e.g., titanocene dichloride, vanadocene dichloride). Certain metallocenes and their derivatives exhibit catalytic properties. Cationic group 4 metallocene derivatives related to $[Cp_2ZrCH_3]^+$ can catalyze olefin polymerization. Examples of suitable metallocene polyethylenes (mPE) include mPEs sold under the trade name ENABLE™ by Exxon. In the case of seam tapes formed from mPEs, the seam tape may work exceptionally well as a seam tape for fabrics made with PO, PP, and/or PE w/b membranes. Metallocene PE films can have exceptionally good hand (they are soft, pliable, and elastic) and, in addition, they can have a melt temperature of about 99° C. or 100° C.

In one example, the polyolefin can comprise a polypropylene polyethylene block copolymer having a melt temperature of from 155° C. to 175° C. (e.g., from 165° C. to 175° C.). In one example, the polyolefin can comprise metallocene polyethylene having a melt temperature of from 80° C. to 120° C. (e.g., from 90° C. to 110° C., from 95° C. to 105° C., or from 99° C. to 100° C.).

When the microporous polyolefin film is formed from the various materials described above, by way of example, from a polyolefin combined with one or more block or impact copolymers, the microporous polyolefin film can be used to form microporous membranes, materials, layers, composites, laminates, or textiles with targeted, enhanced performance properties in or for textile related end use applications. Tailoring the choice of composition, in the chemical structure of the polymeric blend or composition of the modified composition, membrane or fiber, or material, layer, composite, laminate, or textile made therewith or therefrom can influence performance properties such as hand, drape, "quietness" with movement, and surface coefficient of friction thereby producing microporous polyolefin membranes, fibers, microporous fibers, or materials, layers, composites, laminates, or textiles with better hand, softer drape, quieter movement, and/or lower coefficient of friction resulting in, for example, a silkier touch.

In other select embodiments, the microporous polyolefin film can further include other ingredients. For example, the microporous polyolefin film can further include fillers (e.g., inert particulates used to reduce the cost of the film, but otherwise having no significant impact on the manufacture of the membrane or its physical properties), anti-static agents, anti-blocking agents, anti-oxidants, lubricants (e.g., to facilitate manufacture), and the like.

In other embodiments, various materials may be added to the polyolefin to modify or enhance the properties of resulting membranes. Such materials include, but are not limited to: (1) mineral fillers including, but not limited to, calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide and the like, and blends thereof; (2) elastomers including, but not limited to, ethylene-propylene (EPR), ethylene-propylene-diene (EPDM), styrene-butadiene (SBR), styrene isoprene (SIR), ethylidene norbornene (ENB), epoxy, and polyurethane and blends thereof; (3) wetting agents including, but not limited to, ethoxylated alcohols, primary polymeric carboxylic acids, glycols (e.g., polypropylene glycol and polyethylene glycols), functionalized polyolefins, etc.; (4) lubricants, for example, silicone, fluoropolymers, Kemamide®, oleamide, stearamide, erucamide, calcium stearate, or other metallic stearate; (5) flame retardants for example, brominated flame retardants, ammonium phosphate, ammonium hydroxide, alumina trihydrate, and phosphate ester; (6) cross-linking or coupling agents; (7) polymer processing aid; and (8) any type of nucleating agents including beta-nucleating agent for polypropylene. In one example, the polyolefin can comprise a polypropylene based impact copolymer with 90-97% polypropylene content compounded with a beta-nucleating (BN) agent.

In certain embodiments, microporous polyolefin film can comprise 1) one or more block or impact copolymers (BCPs or ICPs) or 2) a polyolefin in combination with one or more BCPs or ICPs. These olefin materials can provide for a range of differentiated textile materials having improved performance properties such as more desirable hand, drape and surface coefficient of friction for use in a variety of textile end use applications which may also require waterproof and breathability performance, such as outerwear, disposable garments, durable garments, textile materials requiring relative humidity equalization, and garments or items in medical related applications.

In some cases, the microporous polyolefin film can have a JIS Gurley of 100 seconds or less (e.g., 95 seconds or less, 90 seconds or less, 85 seconds or less, 80 seconds or less, 75 seconds or less, 70 seconds or less, 65 seconds or less, 60 seconds or less, 55 seconds or less, 50 seconds or less, 45 seconds or less, 40 seconds or less, 35 seconds or less, 30 seconds or less, 25 seconds or less, 20 seconds or less, or 15 seconds or less). In some embodiments, the microporous polyolefin film can have a JIS Gurley of at least 10 seconds (e.g., at least 15 seconds, at least 20 seconds, at least 25 seconds, at least 30 seconds, at least 35 seconds, at least 40 seconds, at least 45 seconds, at least 50 seconds, at least 55 seconds, at least 60 seconds, at least 65 seconds, at least 70 seconds, at least 75 seconds, at least 80 seconds, at least 85 seconds, at least 90 seconds, or at least 95 seconds.

The microporous polyolefin film can have a JIS Gurley ranging from any of the minimum values described above to any of the maximum values described above. For example, the microporous polyolefin film can have a JIS Gurley of from 10 seconds to 100 seconds (e.g., from 10 seconds to 75 seconds).

In some embodiments, the microporous polyolefin film can have a thickness of at least 8 microns (e.g., a thickness of at least 10 microns, a thickness of at least 15 microns, a thickness of at least 20 microns, a thickness of at least 25 microns, a thickness of at least 30 microns, a thickness of at least 35 microns, a thickness of at least 40 microns, a thickness of at least 45 microns, a thickness of at least 50 microns, a thickness of at least 55 microns, a thickness of at least 60 microns, a thickness of at least 65 microns, a thickness of at least 70 microns, a thickness of at least 75 microns, a thickness of at least 80 microns, a thickness of at least 85 microns, a thickness of at least 90 microns, or a thickness of at least 95 microns). In some embodiments, the microporous polyolefin film can have a thickness of 100 microns or less (e.g., 95 microns or less, 90 microns or less, 85 microns or less, 80 microns or less, 75 microns or less, 70 microns or less, 65 microns or less, 60 microns or less, 55 microns or less, 50 microns or less, 45 microns or less, 40 microns or less, 35 microns or less, 30 microns or less, 25 microns or less, 20 microns or less, 15 microns or less, or 10 microns or less.

The microporous polyolefin film can have a thickness ranging from any of the minimum values described above to any of the maximum values described above. For example, the microporous polyolefin film can have a thickness of from 8 microns to 100 microns (e.g., from 10 microns to 100 microns, from 8 microns to 80 microns, or from 25 microns to 75 microns). In one example, the microporous polyolefin film can have a thickness of from 38 microns to 50 microns.

In some embodiments, the microporous polyolefin film can have a MD tensile strength of at least 200 kg/cm$^2$ (e.g., at least 250 kg/cm$^2$, at least 300 kg/cm$^2$, at least 350 kg/cm$^2$, at least 400 kg/cm$^2$, at least 450 kg/cm$^2$, at least 500 kg/cm$^2$, at least 550 kg/cm$^2$, at least 600 kg/cm$^2$, at least 650 kg/cm$^2$, at least 700 kg/cm$^2$, at least 750 kg/cm$^2$, at least 800 kg/cm$^2$, at least 850 kg/cm$^2$, at least 900 kg/cm$^2$, at least 950 kg/cm$^2$, at least 1000 kg/cm$^2$, at least 1100 kg/cm$^2$, at least 1200 kg/cm$^2$, at least 1300 kg/cm$^2$, or at least 1400 kg/cm$^2$). In some embodiments, the microporous polyolefin film can have a MD tensile strength of 1500 kg/cm$^2$ or less (e.g., 1400 kg/cm$^2$ or less, 1300 kg/cm$^2$ or less, 1200 kg/cm$^2$ or less, 1100 kg/cm$^2$ or less, 1000 kg/cm$^2$ or less, 950 kg/cm$^2$ or less, 900 kg/cm$^2$ or less, 850 kg/cm$^2$ or less, 800 kg/cm$^2$ or less, 750 kg/cm$^2$ or less, 700 kg/cm$^2$ or less, 650 kg/cm$^2$ or less, 600 kg/cm$^2$ or less, 550 kg/cm$^2$ or less, 500 kg/cm$^2$ or less, 450 kg/cm$^2$ or less, 400 kg/cm$^2$ or less, 350 kg/cm$^2$ or less, 300 kg/cm$^2$ or less, or 250 kg/cm$^2$ or less).

The microporous polyolefin film can have a MD tensile strength ranging from any of the minimum values described above to any of the maximum values described above. For example, the microporous polyolefin film can have a MD tensile strength of from 200 kg/cm$^2$ to 1500 kg/cm$^2$ (e.g., from 600 kg/cm$^2$ to 1500 kg/cm$^2$).

In some embodiments, the microporous polyolefin film can have a TD tensile strength of at least 175 kg/cm$^2$ (e.g., at least 200 kg/cm$^2$, at least 225 kg/cm$^2$, at least 250 kg/cm$^2$, at least 275 kg/cm$^2$, at least 300 kg/cm$^2$, at least 350 kg/cm$^2$, at least 400 kg/cm$^2$, at least 500 kg/cm$^2$, at least 600 kg/cm$^2$, at least 700 kg/cm$^2$, at least 800 kg/cm$^2$, at least 900 kg/cm$^2$, or at least 1000 kg/cm$^2$). In some embodiments, the microporous polyolefin film can have a TD tensile strength of 1100 kg/cm$^2$ or less (e.g., 1000 kg/cm$^2$ or less, 900 kg/cm$^2$ or less, 800 kg/cm$^2$ or less, 700 kg/cm$^2$ or less, 600 kg/cm$^2$ or less, 500 kg/cm$^2$ or less, 400 kg/cm$^2$ or less, 350 kg/cm$^2$ or less, 300 kg/cm$^2$ or less, 275 kg/cm$^2$ or less, 250 kg/cm$^2$ or less, 225 kg/cm$^2$ or less, or 200 kg/cm$^2$ or less).

The microporous polyolefin film can have a TD tensile strength ranging from any of the minimum values described above to any of the maximum values described above. For example, the microporous polyolefin film can have a TD tensile strength of from 175 kg/cm$^2$ to 1100 kg/cm$^2$.

In some embodiments, the ratio of MD tensile strength to TD tensile strength can be at least 0.5 (e.g., at least 1.0, at least 2.0, at least 3.0, at least 4.0, or at least 5.0). In some embodiments, the ratio of MD tensile strength to TD tensile strength can be 6.0 or less (e.g., 5.0 or less, 4.0 or less, 3.0 or less, 2.0 or less, or 1.0 or less.

The ratio of MD tensile strength to TD tensile strength can range from any of the minimum values described above to any of the maximum values described above. For example, the microporous polyolefin film can exhibit a ratio of MD tensile strength to TD tensile strength of from 0.5 to 6.0 (e.g., from 0.5 to 5.0, or from 0.5 to 4.0).

In certain embodiments, the microporous polyolefin film can have a TD shrinkage of less than 6.0% at 90° C. and less than 15.0% at 120° C.

In some embodiments, the microporous polyolefin film can have a porosity of at least 20% (e.g., at least 40%, at least 50%, at least 65%, or at least 80%). In some embodiments, the microporous polyolefin film can have a porosity of 90% or less (e.g., 80% or less, 65% or less, 50% or less, or 40% or less).

The microporous polyolefin film can have a porosity ranging from any of the minimum values described above to any of the maximum values described above. For example, the microporous polyolefin film can have a porosity of from 20% to 90% (e.g., a porosity of from 20% to 80%, a porosity of from 40% to 90%, or a porosity of from 65% to 90%).

In some embodiments, the microporous polyolefin film can have a mean flow pore diameter (measured with Capillary Flow analysis using the ASTM F316-86 standard method) of at least 0.04 microns (e.g., a mean flow pore diameter of at least 0.05 microns).

In some embodiments, the microporous polyolefin film can have an Aquapore size (measured using the Aquapore available through PMI (Porous Materials Inc.)) of at least 0.06 microns (e.g., at least 0.08 microns).

In some embodiments, the microporous polyolefin film can have a hydrohead pressure (measured using the ASTM D3393-91 standard method) of greater than about 140 psi.

In one embodiment, the microporous polyolefin film can be a mPE film with a thickness of about 54.4 microns, a basis weight of about 48.6 microns, a puncture strength of about 410 grams, an MD tensile strength of about 438 kg/cm$^2$, a percent elongation at break in the MD of about 759%, a TD tensile strength of about 248 kg/cm$^2$, and a percent elongation at break in the TD of about 817%.

In one embodiment, the microporous polyolefin film can be a mPE film with a thickness of about 97 microns, a basis weight of about 88.9 microns, a puncture strength of about 678 grams, an MD tensile strength of about 371 kg/cm$^2$, a percent elongation at break in the MD of about 815%, a TD tensile strength of about 352 kg/cm$^2$, and a percent elongation at break in the TD of about 999%.

The microporous polyolefin film can comprise a single-ply microporous polyolefin film or a multi-ply microporous polyolefin film (e.g., a bilayer film, a trilayer film, a quad-layer film, etc.). Multi-ply films can be prepared using standard lamination methods known in the art. Multi-ply films can be prepared using co-extrusion methods known in the art. Multi-ply films can be made of plies of the same materials or of differing materials. In certain embodiments, the microporous polyolefin film can comprise a multi-ply comprising at least three layers (e.g., at least four layers, at least five layers, at least six layers, or at least seven layers). In some cases, the microporous polyolefin film can comprise a multi-ply comprising from three to eight layers (e.g., from three to six layers). In one embodiment, the microporous polyolefin film can comprise a polypropylene-polyethylene-polypropylene trilayer film.

In one example embodiment, the microporous polyolefin film can comprise Celgard® microporous membranes, particularly a Z-Series membrane.

Optionally, in some embodiments, the seam tape can further comprise a nonwoven material (e.g., a spunbond and/or meltblown nonwoven material), a woven material, or a knit material disposed on a side of the microporous polyolefin film. The nonwoven can be, for example, a polypropylene nonwoven. In these embodiments, the microporous polyolefin film and the nonwoven, woven, and/or knit material can be combined through any suitable process, such as adhesive or thermal lamination, embossing, calendering, or combinations thereof.

Optionally, in some embodiments, the seam tape can further comprise an adhesive. The adhesive can be, for example, a polymer adhesive. Suitable adhesives are known in the art, and can be selected based on their adhesion properties, hydrophobicity or hydrophilicity, melting point, shear resistance, bonding/coating properties, washing and dry cleaning temperature resistance, cleaning solvent resistance, high temperature resistance (e.g., ability to withstand autoclaving) chemical resistance, gas resistance, resistance to pathogens such as viruses and bacteria, as well as ability to commingle with the laminated fabrics or their components so as to create a hydrostatically sealed seam or a seam that is resistant to chemical and/or biological agents. The seam tape would also be designed to be stretchable to match the stretch characteristics of the face fabric and inner liner laminates. Suitable adhesive polymer resins include, but are not limited to, polyurethanes, polypropylenes, polyamides, polyesters, and polyolefins.

In some embodiments, the seam tape can include a base material, and an adhesive applied to one side of the base material. The base material can include any materials or methods of manufacture disclosed herein. In one embodiment, the base material can include a microporous polyolefin film. In other select embodiments, the base material can include a monolithic film. Yet in other select embodiments, the base material can include both microporous polyolefin films and monolithic films in combination. The base material can be provided with any desired thickness for the seam tape. In some select embodiments, the base material can include a single layer to produce the desired thickness. In other select embodiments, the base material can be made from multiple layers to produce the desired thickness of the seam tape. The tape or tape base material could be 1-ply (monolayer), 2-ply (bi-layer), 3-ply (tri-layer), 4-ply (quad-layer)-membranes, or any number of layers required to produce the desired final seam tape thickness.

The seam tapes described herein can be of various shapes and sizes. In some embodiments, the seam tape is 0.5 inches or greater in length (e.g., 1 inch or greater, 2 inches or greater, 3 inches or greater, 4 inches or greater, 5 inches or greater, 6 inches or greater, 7 inches or greater, 8 inches or greater, 9 inches or greater, 10 inches or greater, 15 inches or greater, 20 inches or greater, 25 inches or greater, 30 inches or greater, 35 inches or greater). In some embodiments, the seam tapes are 150 inches in length or less (e.g., 100 inches or less, 50 inches or less, 40 inches or less, 30 inches or less, 20 inches or less, 10 inches or less, 5 inches or less, 2 inches or less).

In some embodiments, the seam tape is 0.25 inches or greater in width (e.g., 0.3 inches or greater, 0.4 inches or greater, 0.5 inches or greater, 0.75 inches or greater, 1 inch or greater, 1.25 inches or greater). In some embodiments, the seam tape is 3 inches or less in width (e.g., 2 inches or less, 1.5 inches or less, 1 inch or less, 0.75 inches or less, 0.5 inches or less, 0.35 inches or less). In certain embodiments, the seam tape can be 15 mm, 16, mm, 17 mm, 18 mm, 19 mm, 20 mm, 21 mm, 22 mm, 23 mm, or 24 mm in width. In certain embodiments, the seam tape can be from 18 mm to 20 mm in width.

In some embodiments, the seam tape is rectangular. In some embodiments, the seam tape is elliptical. In some embodiments, the seam tape is circular. The seam tape can be cut in any shape or pattern. The seam tape can be curved or arced.

The seam tape can be provided as a set of seam tapes forming adjoining strips of a sheet of seam tapes. Individual pieces of seam tape can be separated by lines of perforations. The seam tape can be provided as a continuous roll. In certain embodiments, the seam tape is provided as a continuous roll having a length, for example, of 25 m, 50 m, 75 m, or 100 m.

The seam tapes described herein can be made by preparing suitable microporous polyolefin films using conventional methods.

In some cases, methods can comprise forming a microporous polyolefin film by a dry-stretch process. By way of example, in some embodiments, the microporous polyolefin film can be manufactured by a dry-stretch process where a polyolefin resin is extruded by blown film technique or by cast film method to form a nonporous precursor which is then cold and hot stretched in the machine direction (uniaxially) to form a microporous membrane with a final thickness typically less than 75 μm (e.g., from about 25-75 μm (but may be thinner or thicker depending on the end use)). In some cases, the polyolefin resin can be one or more block copolymers (BCPs) or impact copolymers (ICPs), which can each comprise polypropylene and/or polyethylene. Alternatively, the polyolefin resin can be extruded by blown film technique or by cast film method to form a nonporous precursor which is then cold and/or hot stretched in both the machine and transverse directions (biaxially) to form a microporous membrane seam tape with a final thickness typically less than 75 μm, preferably from about 25-75 μm.

In some cases, the microporous polyolefin film can be manufactured by a dry-stretch process where a polyolefin resin is extruded by blown film technique or by cast film method to form a nonporous precursor which is then biaxially stretched (i.e., not only stretched in the machine direction, but also in the transverse machine direction). This process is discussed in great detail in U.S. Patent Application Publication Nos. 2007/0196638 and 2011/0223486, which are incorporated herein by reference, and discussed further below.

In general, the process for making the microporous polyolefin film may include the steps of extruding a nonporous precursor, and then biaxially stretching the nonporous precursor. Optionally, the nonporous precursor may be annealed prior to stretching. Optionally, the nonporous precursor can be stretched in the machine direction prior to biaxial stretching. In one embodiment, the biaxial stretching includes a machine direction stretch and a transverse direction with a simultaneous controlled machine direction relax. The machine direction stretch and the transverse direction stretch can be simultaneous or sequential. In one embodiment, the machine direction stretch is followed by the transverse direction stretch with the simultaneous machine direction relax. This process is discussed in greater detail below.

Extrusion can be generally conventional (conventional refers to conventional for a dry-stretch process). The extruder can have a slot die (for flat precursor) or an annular die (for parison precursor). In the case of the latter, an inflated parison technique can be employed (e.g., a blow up ratio (BUR)). However, the birefringence of the nonporous precursor may not have to be as high as in the conventional dry-stretch process. For example, in the conventional dry-stretch process to produce a membrane with a >35% porosity from a polypropylene resin, the birefringence of the precursor may, in some cases, be >0.0130; while with the instant process, the birefringence of the PP precursor could be as low as 0.0100. In another example, a membrane with a >35% porosity from a polyethylene resin, the birefringence of the precursor may, in some instances, be >0.0280; while with the instant process, the birefringence of the PE precursor could be as low as 0.0240.

In some embodiments, the nonporous precursor can be one of a blown film and a slot die film. The nonporous precursor can be a single layer precursor formed by at least one of single layer extrusion and multilayer extrusion, or a multilayer precursor formed by at least one of coextrusion and lamination Annealing (optional) can be carried out, in one embodiment, at temperatures between $T_m$-80° C. and $T_m$-10° C. (where $T_m$ is the melt temperature of the polymer); and in another embodiment, at temperatures between $T_m$-50° C. and $T_m$-15° C. Some materials (e.g., those with high crystallinity after extrusion, such as polybutene) may require no annealing.

Machine direction stretch can be conducted as a cold stretch or a hot stretch or both, and as a single step or multiple steps. In one embodiment, cold stretching may be carried out at <$T_m$-50° C., and in another embodiment, at <$T_m$-80° C. In one embodiment, hot stretching can be carried out at <$T_m$-10° C. In one embodiment, total machine direction stretching may be in the range of 50-500%, and in another embodiment, in the range of 100-300%. During machine direction stretch, the precursor can shrink in the transverse direction (conventional).

Transverse direction stretching can include a simultaneous controlled machine direction relax. This means that as the precursor is stretched in the transverse direction the precursor is simultaneously allowed to contract (i.e., relax), in a controlled manner, in the machine direction. The transverse direction stretching can be conducted as a cold step, or a hot step, or a combination of both. In one embodiment, total transverse direction stretching can be in the range of 100-1200%, and in another embodiment, in the range of 200-900%. In one embodiment, the controlled machine direction relax can range from 5-80%, and in another embodiment, in the range of 15-65%. In one embodiment, transverse stretching can be carried out in multiple steps. During transverse direction stretching, the precursor may or may not be allowed to shrink in the machine direction. In an embodiment of a multi-step transverse direction stretching, the first transverse direction step can include a transverse stretch with the controlled machine relax, followed by simultaneous transverse and machine direction stretching, and followed by transverse direction relax and no machine direction stretch or relax.

Optionally, the precursor, after machine direction and transverse direction stretching can be subjected to a heat setting, as is well known.

In some embodiments, the dry-stretch process can include the steps of: machine direction stretching followed by said biaxial stretching including said transverse direction stretching with simultaneous controlled machine direction relax, a second transverse direction stretching with simultaneous machine direction stretching, followed by optional transverse direction relax.

In some embodiments, the biaxial stretching step of the dry-stretch process includes the simultaneous biaxial stretching of a plurality of separate, superimposed, layers or plies of nonporous precursor, wherein none of the plies are bonded together during the stretching process.

In some embodiments, the biaxial stretching step of the dry-stretch process includes the simultaneous biaxial stretching of a plurality of bonded, superimposed, layers or plies of nonporous precursor, wherein all of the plies are bonded together during the stretching process.

In some embodiments, one or more impact copolymers comprising polypropylene and polyethylene can be extruded by a blown film technique or by a cast film method to form a nonporous precursor film which is then cold and hot stretched initially in the machine direction (MD) and sequentially stretched in the transverse direction (TD) to form a biaxially stretched or biaxially oriented (BO) microporous membrane according to the method described in U.S. Patent Application Publication No. 2011/0223486, where the biaxial stretch step includes simultaneous machine direction relax.

In some embodiments, one or more impact copolymers comprising polypropylene and polyethylene can be extruded by a blown film technique or by a cast film method to form a nonporous precursor film which is then cold and hot stretched initially in the machine direction and sequentially stretched in the transverse direction to form a biaxially stretched or biaxially oriented (BO) microporous membrane according to the method described in US2011/0223486 where the biaxial stretch step does not include simultaneous machine direction relax.

In some embodiments, a primarily polypropylene (PP)-based block copolymer (BCP) with 90-97% polypropylene content can be compounded with a beta-nucleating (BN) agent and extruded, using a cast method, to form a nonporous beta-nucleated polypropylene based BCP precursor. Biaxial stretching of the beta nucleated polypropylene precursor may fracture the interfaces which exist between regions of beta nucleated PP and regions of alpha nucleated of PP. The fracturing process may form pores in the beta-nucleated biaxially oriented polypropylene (BN-BOPP) membrane producing a microporous membrane with a thickness of less than 75 microns (e.g., from about 12 microns to 25 microns).

In some embodiments, the microporous polyolefin film can comprise a polyolefin (PO) in combination with one or more block or impact copolymers (BCPs or ICPs). In these embodiments, the polyolefin combined with one or more impact or block copolymers can be extruded by a blown film technique or by a cast film method to form a nonporous precursor which is then cold and hot stretched in the machine direction (uniaxially) to form a microporous membrane or film.

In some embodiments, the microporous polyolefin film can comprise a PO in combination with one or more ICPs. In these embodiments, the PO in combination with the one or more ICPs can be extruded by a blown film technique or by a cast film method to form a nonporous precursor which is then cold and hot stretched in the machine direction (MD) and sequentially stretched in the transverse direction (TD) to form a biaxially stretched or biaxially oriented (BO) microporous membrane according to the stretch method described in U.S. Patent Application Publication No. 2011/0223486. The transverse stretching step includes a simultaneous machine direction relax step to produce a biaxially oriented (BO) microporous membrane.

In some embodiments, the microporous polyolefin film can comprise a PO in combination with one or more ICPs. In these embodiments, the PO in combination with the one or more ICPs can be extruded by a blown film technique or by a cast film method to form a nonporous precursor which is then cold and hot stretched in the machine direction and sequentially stretched in the transverse direction to form a biaxially stretched or biaxially oriented (BO) microporous membrane according to the method described in U.S. Patent Application Publication No. 2011/0223486. The transverse stretching step does not include a simultaneous machine direction relax step to produce a biaxially oriented (BO) microporous membrane.

In some embodiments, the microporous polyolefin film can comprise a PO in combination with one or more ICPs, where the ICP is primarily a polypropylene (PP) based ICP with a 90-97% PP content. In these embodiments, methods can comprise compounding the ICP with a beta-nucleating (BN) agent, and extruding the ICP using a cast method to form a nonporous beta nucleated PO/ICP precursor. Biaxial stretching of the beta nucleated polypropylene precursor may fracture the interfaces which exist between regions of beta nucleated PP and regions of alpha nucleated PP. The fracturing process may form pores in the beta-nucleated biaxially oriented polypropylene (BN-BOPP) membrane producing a microporous membrane with a thickness of less than 75 microns (e.g., from about 12 microns to 25 microns).

Certain microporous polyolefin films are highly hydrophobic and exceptionally breathable, which makes them ideal as the barrier layer in waterproof/breathable textiles such as high-performance outerwear. Traditionally, in the development of such polyolefin films, raw material polymers have been selected, among other factors, with a view toward providing physically robust films. This has resulted in stiffer films that tend to crinkle, thus providing less than ideal "hand" (i.e., tactile experience). In the case of the seam tapes described herein, the microporous polyolefin films can be fabricated to exhibit improved hand. One method for improving the hand of such PO films is to use a polypropylene/polyethylene block copolymer resin.

In accordance with one example, the seam tape can comprise a microporous polyolefin membrane laminated to a porous polymer nonwoven material or mesh, such as a polyolefin nonwoven mesh. Optionally, the assembly can be microcreped.

In some embodiments, the seam tape can be further improved, treated or modified using a technique or treatment such as a coating or microcreping to introduce permanent small, regularly spaced, crepes, profiles, compactions, pleats, or wrinkles into the laminated or composite microporous polyolefin film for the purpose of improving mechanical strength, elasticity and/or resiliency. In addition, the microcreped seam tapes can exhibit improved "hand" or softness, improved "next-to-the-skin" softness, and/or improved "quietness" (e.g., lack of crinkling noises during movement), which may be desired performance properties or characteristics of or in textile garments, materials or applications.

As described above, the seam tapes provided herein can be used to seal the seams of waterproof fabrics, including polyolefin-based waterproof fabrics. Although the seam tape described herein can work well with polypropylene based w/b materials or textiles, the seam tapes can also be used with other w/b membranes and films, including, but not limited to, polyurethane, PTFE, polyester, polyethylene, polypropylene, polyethylene-polypropylene blends, polyolefin copolymers, wet process, dry process, or BNBOPP process porous membranes, the like, and/or other similar films, substrates or membranes, or combinations thereof. For example, a PP membrane can be seamed or joined to a PE membrane.

Accordingly, also provided are seams sealed by means of the seam tapes described herein. The seams can comprise a first edge of waterproof fabric (e.g., polyolefin-based waterproof fabric, such as a PP w/b membrane and/or PE w/b membrane) sewn together to a second edge of waterproof fabric (e.g., polyolefin-based waterproof fabric, such as a PP w/b membrane and/or PE w/b membrane) along a stitch line; and a seam tape described herein adhered to the first edge of waterproof fabric and the second edge of waterproof fabric and covering the stitch line.

In some embodiments, the seam can further comprise an adhesive bonding the seam tape to the first edge of waterproof fabric and the second edge of waterproof fabric. In some embodiments, the seam can be substantially free of adhesives.

Also provided are materials, fabrics, and garments comprising one or more of the seams described above, as well as methods of making materials, fabrics, and garments using the seam tapes described herein. Methods of making materials, fabrics, and garments can comprise joining a first edge of waterproof fabric to a second edge of waterproof fabric. These methods can comprise sewing together a first edge of waterproof fabric to a second edge of waterproof fabric to form a stitch line; applying a seam tape described herein to cover the stitch line, and adhering the seam tape to the first edge of waterproof fabric and the second edge of waterproof fabric. Adhering the seam tape to the first edge of waterproof fabric and the second edge of waterproof fabric can comprise heating the seam tape to a temperature above the melt temperature of the microporous polyolefin film. Adhering the seam tape to the first edge of waterproof fabric and the second edge of waterproof fabric can comprise heating the seam tape to a temperature above the melt temperature of a polymer adhesive present on the seam tape.

In accordance with at least selected embodiments, this application is directed to seam tapes, products made with seam tapes, methods of manufacture and/or methods of use of seam tapes. In accordance with at least certain embodiments, exemplary seam tapes may be compatible with polyolefin-based waterproof/breathable (w/b) membranes, including polypropylene (PP) w/b membranes and/or polyethylene (PE) w/b membranes, and/or seams sealed by means of these seam tapes, as well as, materials, fabrics, and/or garments including one or more of the sealed seams.

By way of non-limiting illustration, examples of certain embodiments of the present disclosure are given below.

EXAMPLES

All materials were characterized using the following methods unless otherwise stated. The thickness of membranes was measured with an Emveco model 210-A microgage bench micrometer according to the method described in ASTM D374-99 (2004) entitled "Standard Test Methods for Thickness of Solid Electrical Insulation," which is incorporated herein by reference in its entirety. Gurley, as used herein, refers to the Japanese Industrial Standard (JIS Gurley), and was measured using the OHKEN permeability tester. JIS Gurley is defined as the time in seconds required for 100 cc of air to pass through one square inch of film at a constant pressure of 4.9 inches of water.

Basis weight refers to the weight per unit sample area of a material, and can be expressed in grams/meter squared. Basis weight was determining the mass (in grams) of a test sample having a known area (in m$^2$). % Shrinkage was measured by incubating a sample in an oven at 90° C. for 1 hour. Shrinkage was then measured in the MD and/or the TD. Puncture Strength is measured using Instron Model 4442 tensile tester according to the method described in ASTM D3763-14 entitled "Standard Test Method for High Speed Puncture Properties of Plastics Using Load and Displacement Sensors," which is incorporated herein by reference in its entirety. The measurements were made across the width of the microporous membrane and the puncture strength was as the force required to puncture the test sample. The tensile strength of membranes (both MD and TD) was measured with an Instron Model 4201 tensile tester according to the method described in ASTM D882-12 (2012) entitled "Standard Test Method for Tensile Properties of Thin Plastic Sheeting," which is incorporated herein by reference in its entirety. % MD elongation at break refers to the percentage of extension of a test sample along the MD of the test sample measured at the maximum tensile strength needed to break the sample. % TD elongation at break refers to the percentage of extension of a test sample along the TD of the test sample measured at the maximum tensile strength needed to break a sample. The porosity of membranes was measured according to the method described in ASTM D2873-94 (1999) entitled "Standard Test Method for Interior Porosity of Poly(Vinyl Chloride) (PVC) Resins by Mercury Intrusion Porosimetry," which is incorporated herein by reference in its entirety.

The membranes described in the following examples were produced by conventional dry-stretched techniques, except as noted.

Example 1

An impact copolymer polyolefin resin was melt extruded to from a nonporous precursor membrane 25 microns in thickness. The nonporous precursor membrane was then stretched uniaxially in the machine direction (MD) to produce a microporous film that was 20.8 microns in thickness and had a JIS Gurley value=1,354 seconds. The physical properties of this membrane are summarized in Table 1 below.

Example 2

The uniaxially stretched microporous membrane prepared in Example 1 was subsequently biaxially stretched using a transverse direction (TD) stretching device without machine direction (MD) relax. The TD stretched membrane was stretched in the TD direction 2 to 4 times its input width. The resulting microporous membrane had a JIS Gurley of <100 seconds, which is an acceptable level of air permeability to function as a breathable textile membrane seam tape.

Example 3

The uniaxially stretched microporous membrane prepared in Example 1 was subsequently biaxially stretched in the transverse direction (TD) with a simultaneous MD relax step as described in U.S. Patent Application Publication No. 2011/0223486. TD stretching at 4.5× stretch and a 0-16% overall MD relax produced a microporous membrane with a thickness of 10.9 microns and a JIS Gurley value of 73 seconds. The physical properties of this membrane are summarized in Table 1 below.

Example 4

An impact copolymer polyolefin resin was melt extruded to form a nonporous precursor membrane 35 microns in thickness. The nonporous precursor membrane was then stretched uniaxially in the machine direction (MD) to produce a microporous film that was 26 microns in thickness and had a JIS Gurley value of 3,454 seconds. The physical properties of this membrane are summarized in Table 1 below.

Example 5

The uniaxially stretched microporous membrane prepared in Example 4 was subsequently biaxially stretched in the transverse direction (TD) with a simultaneous MD relax step as described in U.S. Patent Application Publication No. 2011/0223486. TD stretching at 4.5× stretch and a 0-16% overall MD relax produced a microporous membrane with a thickness of 19 microns and a JIS Gurley value of 25 seconds. The physical properties of this membrane are summarized in Table 1 below.

TABLE 1

Summary of the physical properties of the membranes prepared in Examples 1 and 3-5.

| | Membrane | | | |
|---|---|---|---|---|
| | Example 1 | Example 3 | Example 4 | Example 5 |
| Thickness (microns) | 20.8 | 10.9 | 26 | 19 |
| JIS Gurley (sec) | 1,354 | 73 | 3,454 | 25 |
| Basis Weight (g/m$^2$) | 10.4 | 2.6 | 15.5 | 4.0 |
| % MD shrinkage (90° C., 1 hour) | 12.1 | 6.6 | 0.6 | 5.7 |
| % TD shrinkage (90° C., 1 hour) | — | 0.87 | | 4.2 |
| Puncture Strength (g) | — | 69.9 | | 124 |
| MD tensile strength (kg/cm$^2$) | 1,538 | 397.6 | 1,612 | 561.0 |
| TD tensile strength (kg/cm$^2$) | 163.8 | 393.3 | 194 | 266.3 |
| % MD elongation at break | 52.4 | 67.9 | 78.2 | 120.5 |
| % TD elongation at break | 651.9 | 43.1 | 685.8 | 58.8 |

Example 6

A polypropylene (PP)-based impact copolymer was extruded to form a film. The extruder melt temperature was 249° C. The polymer melt was fed to an extrusion die set at 215° C. The polymer melt was cooled by blowing air. The extruded film had a thickness of 34 microns and birefringence of 0.0116.

The extruded precursor was then annealed at 154° C. for 2 minutes. The annealed film was then cold stretched to 30% at room temperature, and then hot stretched 190% and relaxed 61% at 140° C. (total MD stretch=159%). The MD stretched film had a thickness of 26 microns and porosity of 40%. The MD stretched film was then TD stretched 260% at 150° C. with 50% MD relax, followed by a simultaneous MD and TD stretch of 50% and 216%, respectively, at 150° C.

The physical properties of this membrane are summarized in Table 2 below. For purposes of comparison, the physical properties of two samples of commercially available dry-stretched films: (A) CELGARD® 2400 (a single ply polypropylene membrane); and (B) CELGARD® 2325 (a trilayer polypropylene/polyethylene/polypropylene membrane).

TABLE 2

Summary of the physical properties of the membrane prepared in Examples 6.

|  | A | B | Example 6 |
|---|---|---|---|
| Thickness (microns) | 25.4 | 25.1 | 17 |
| Porosity | 37% | 40% | 73% |
| TD Tensile Strength (kg/cm$^2$) | 160 | 146 | 287 |
| MD Tensile Strength (kg/cm$^2$) | 1,700 | 1,925 | 558 |
| MD/TD Tensile Strength Ratio | 10.6 | 13.2 | 1.9 |
| TD Stretching | — | — | 450% |

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A seam tape adapted to prevent water leakage through holes made by a needle in a seam during stitching, comprising:
   a microporous, dry-stretched, polyolefin film including a plurality of pores, wherein
   the microporous, dry-stretched, polyolefin film comprises a polymer selected from the group consisting of impact copolymer polypropylenes, metallocene polyethylenes, and polypropylene polyethylene block copolymers;
   an adhesive disposed on one side of the microporous, dry-stretched, polyolefin film;
   and wherein the microporous, dry-stretched, polyolefin film has a porosity of from 20% to 80%.

2. The seam tape of claim 1, wherein the plurality of pores have a substantially round shape.

3. The seam tape of claim 1, wherein the plurality of pores have an average pore size of from 0.03 microns to 0.50 microns.

4. The seam tape of claim 1, wherein the microporous, dry-stretched, polyolefin film has a TD tensile strength of at least 175 kg/cm$^2$.

5. The seam tape of claim 1, wherein the microporous, dry-stretched, polyolefin film exhibits a ratio of machine direction tensile strength to transverse direction tensile strength of from 0.5 to 5.0.

6. The seam tape of claim 1, wherein the plurality of pores have an aspect ratio of 0.75 to 1.25.

7. The seam tape of claim 1, wherein the microporous, dry-stretched, polyolefin film has a melt temperature of from 80° C. to 175° C.

8. The seam tape of claim 7, wherein the microporous, dry-stretched polyolefin film has a melt temperature of from 80° C. to 120° C.

9. The seam tape of claim 7, wherein the microporous, dry-stretched polyolefin film has a melt temperature of from 155° C. to 175° C.

10. The seam tape of claim 1, wherein the microporous, dry-stretched polyolefin film comprises impact copolymer polypropylene.

11. The seam tape of claim 1, wherein the microporous, dry-stretched polyolefin film comprises a polypropylene polyethylene block copolymer.

12. The seam tape of claim 1, wherein the microporous, dry-stretched, polyolefin film comprises metallocene polyethylene.

13. The seam tape of claim 1, wherein the microporous, dry-stretched, polyolefin film has a TD tensile strength of at least 225 kg/cm$^2$.

14. The seam tape of claim 1, wherein the microporous, dry-stretched, polyolefin film has a thickness of from 8 microns to 80 microns.

15. The seam tape of claim 1, wherein the microporous, dry-stretched, polyolefin film has a TD shrinkage of less than 6.0% at 90° C. and less than 15.0% at 120° C.

16. The seam tape of claim 1, wherein the microporous, dry-stretched, polyolefin film comprises a multi-ply microporous polymer film.

17. The seam tape of claim 1, further comprising a nonwoven material, a woven material, a knit material, or a combination thereof disposed on a side of the microporous, dry-stretched, polyolefin film.

18. The seam tape of claim 1, wherein the microporous, dry-stretched, polyolefin film is a biaxially oriented microporous polyolefin film.

19. A seam comprising the seam tape of claim 1, the seam tape preventing leakage through holes made in the seam during stitching.

20. A seam comprising a first edge of waterproof fabric sewn together to a second edge of waterproof fabric along a stitch line; and
   the seam tape of claim 1 adhered to the first edge of waterproof fabric and the second edge of waterproof fabric and covering the stitch line.

21. The seam of claim 19, further comprising an adhesive bonding the seam tape to the first edge of waterproof fabric and the second edge of waterproof fabric.

22. A seam tape comprising:
- a microporous, dry-stretched, polyolefin film including a plurality of pores, wherein the microporous, dry-stretched, polyolefin film has a JIS Gurley of 100 seconds or less; and
- an adhesive disposed on one side of the microporous, dry-stretched, polyolefin film, and wherein the microporous, dry-stretched, polyolefin film has a porosity of from 40% to 90%, a JIS Gurley of less than 100, a mean flow pore diameter of at least 0.04 microns, and an Aquapore size of at least 0.06 microns.

23. A seam tape adapted to prevent water leakage through holes made by a needle in a seam during stitching, comprising:
- a microporous, dry-stretched, polyolefin film including a plurality of pores having a substantially round shape, wherein the microporous, dry-stretched, polyolefin film has a melt temperature from 80° C. to 175° C.; and
- an adhesive disposed on one side of the microporous, dry-stretched, polyolefin film, wherein the adhesive comprises one or more polyolefins; and
- wherein the plurality of pores have an average pore size of from 0.03 microns to 0.50 microns; and wherein the microporous, dry-stretched, polyolefin film has a porosity of from 20% to 80% and a TD tensile strength of at least 175 kg/cm$^2$.

24. The seam tape of claim 23, wherein the microporous, dry-stretched, polyolefin film exhibits a ratio of machine direction tensile strength to transverse direction tensile strength of from 0.5 to 5.0.

25. The seam tape of claim 23, wherein the plurality of pores have an aspect ratio of from 0.75 to 1.25.

26. The seam tape of claim 23, wherein the microporous, dry-stretched, polyolefin film has a melt temperature of from 80° C. to less than 150° C.

27. The seam tape of claim 23, wherein the microporous, dry-stretched, polyolefin film has a melt temperature of from 80° C. to 120° C.

28. The seam tape of claim 23, wherein the microporous, dry-stretched, polyolefin film has a melt temperature of from 155° C. to 175° C.

29. The seam tape of claim 23, wherein the microporous, dry-stretched, polyolefin film comprises polypropylene, polyethylene, or a combination thereof.

30. The seam tape of claim 26, wherein the microporous, dry-stretched, polyolefin film comprises impact copolymer polypropylene.

31. The seam tape of claim 26, wherein the microporous, dry-stretched, polyolefin film comprises a polypropylene polyethylene block copolymer.

32. The seam tape of claim 26, wherein the microporous, dry-stretched, polyolefin film comprises metallocene polyethylene.

33. The seam tape of claim 23, wherein the microporous, dry-stretched, polyolefin film has a porosity of from 40% to 90%, a JIS Gurley of less than 100, a mean flow pore diameter of at least 0.04 microns, and an Aquapore size of at least 0.06 microns.

34. The seam tape of claim 23, wherein the microporous, dry-stretched, polyolefin film has a TD tensile strength of at least 225 kg/cm$^2$.

35. The seam tape of claim 23, wherein the microporous, dry-stretched, polyolefin film has a thickness of from 8 microns to 80 microns.

36. The seam tape of claim 23 wherein the microporous, dry-stretched, polyolefin film has a TD shrinkage of less than 6.0% at 90° C. and less than 15.0% at 120° C.

37. The seam tape of claim 23, wherein the microporous, dry-stretched, polyolefin film comprises a multi-ply microporous polymer film.

38. The seam tape of claim 23, further comprising a nonwoven material, a woven material, a knit material, or a combination thereof disposed on a side of the microporous, dry-stretched, polyolefin film.

39. The seam tape of claim 23, wherein the microporous, dry-stretched, polyolefin film is a biaxially oriented microporous polyolefin film.

* * * * *